Aug. 15, 1967
J. THÉVENAZ
3,336,096
CAM AND LEVER ADJUSTING MECHANISM FOR
VARIABLE FOCAL LENGTH OBJECTIVES
Filed Oct. 3, 1963
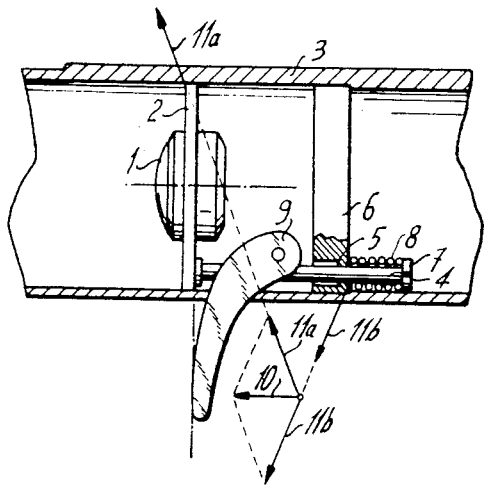
FIG. 1
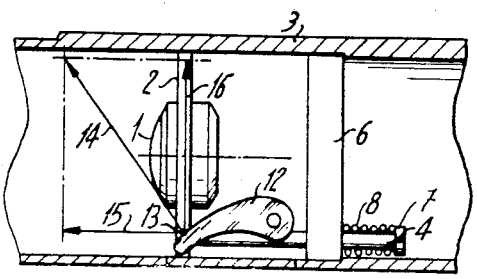
FIG. 2
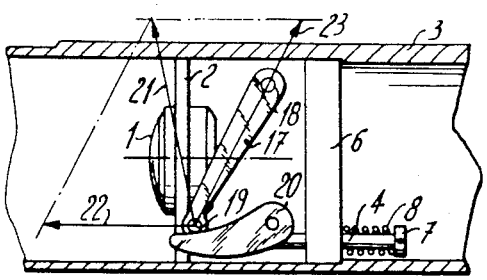
FIG. 3
FIG. 4
INVENTOR
JEAN THEVENAZ
By
Atty

United States Patent Office 3,336,096
Patented Aug. 15, 1967

3,336,096
CAM AND LEVER ADJUSTING MECHANISM FOR VARIABLE FOCAL LENGTH OBJECTIVES
Jean Thévenaz, Grandson, Vaud, Switzerland, assignor to Paillard S.A., Vaud, Switzerland, a corporation of Switzerland
Filed Oct. 3, 1963, Ser. No. 313,467
Claims priority, application Switzerland, Oct. 8, 1962, 11,807/62
3 Claims. (Cl. 350—187)

Objectives with variable focal are generally composed of a base objective and a convergent variator comprising two members whose different relative positions are exactly defined. If there is imposed on one of the members a linear displacement with respect to the control member, the displacement of the other member can present difficulties when it is desired to move it merely by means of a cam.

There is illustrated in FIGURES 1 and 2 of the drawings two known solutions to the problem which are not satisfactory when the displacement to be imparted to a member is relatively large.

FIGURE 1 shows an optical element 1 comprising a group of lenses fixed on a disc 2 adapted to slide in a cylindrical bore of a mounting 3 of the objective. The guidance of disc 2 is controlled by a rod 4 fixed rigidly to the disc and slidably mounted in a hole 5 of a part 6 fixed with respect to the mounting 3. The free end of rod 4 carries a screw 7 serving as a support for spring 8 working under compression and confined between the head of the screw 7 and the fixed piece 6. This spring 8 therefore has the effect of producing a singular force urging the optical element 1 to the right in FIGURE 1.

If the position of the optical element 1 were to be controlled by means of a cam 9, this cam would have to be of large dimensions when the disc 2 is to be displaced over a relatively long distance, these dimensions becoming excessive when it becomes necessary to observe certain laws of the displacement of the optical element 1. FIGURE 1 discloses such an oversize cam, as well as the forces acting on the disc 2 bearing the optical element 1. The line of force 10, exerted by cam 9 can be broken down into two force components 11a and 11b whose lines of action pass respectively through the upper front edge of the disc 2 and through the lower rear edge of the opening in which rod 4 slides. In this breakdown of forces, the force exerted by spring 8 is disregarded. It is clear that if the point of application of force 10 moves further away from the axis of mounting 3, the obtuse angle included between forces 11a and 11b will increase so that the latter approaches the perpendicular of the axis of the mounting. When the angle formed between each of the forces 11a and 11b and a line perpendicular to the axis of the mounting becomes smaller than the angle of the cone of friction of the points of friction between the disc 2 of the element 1 and the mounting 3, there is a jamming of the disc and the latter can no longer be displaced, regardless of the size of the force 10. It is therefore difficult to obtain satisfactory operation by making cam 9 in FIGURE 1 act, for example, on an arm extending from disc 2. In order to obtain reliable operation it would be necessary to increase to a large extent the size of disc 2 and, consequently, the size of mounting 3, which leads to a structural solution of little satisfaction or advantage.

FIGURE 2 shows another form of execution in which a cam 12 presses on a finger 13 projecting from disc 2. In this case, the dimensions of the cam 12 can be much smaller but the pressure exerted by this cam on finger 13 makes a wide angle with the direction of application of the return force of spring 8. The thrust force of cam 12 is shown by arrow 14 and this force can be broken down into two force components 15 and 16. Only force 15 is used and is opposed to the return force of spring 8, while force 16 is harmful and produces considerable friction between the upper edge of the disc 2 and the inner wall of the mounting 3. This friction produces substantial wear and causes frictional forces whereby the line of action of the resultant force is at a distance from the line of action of force 15, which again gives rise to a torque tending to make disc 2 assume an oblique position in the bore of the mounting, which can cause jamming of the disc.

The object of the present invention is to remedy the difficulties set forth above.

The subject of the invention is an objective with variable focal comprising at least one optical element 1 mounted on a support 2 slidable in a mounting 3. The displacements of support 2 are controlled by means of a cam 20 and a lever 17, the latter being articulated around an axis 18 fixed with respect to the mounting 3, characterized in that the lever 17 presses with its free end against the surface of support 2 which is substantially perpendicular to the axis of the mounting 3. The cam is disposed in such a way as to act on the free end of the lever 17, the axis 18 of articulation of lever 17 being placed in such a way that the general direction of movement of the lever 17 will be close to the angle formed between the lines of force at the points of contact of lever 17 with the cam 20 and said surface of support 2.

FIGURE 3 of the drawing shows, schematically and partly in section, a form of execution of the objective which is the subject of the invention.

FIGURE 4 is a fragmentary end elevation illustrating a portion of the structure shown in FIGURE 3.

In this form of execution, a lever 17 is articulated at 18 to the mounting 3 of the objective. The lever has a finger 19 cooperating with a cam 20 controlling the position of disc 2. Finger 19 passes through lever 17 from side to side and also presses against the rear surface of disc 2.

The line of force 21 exerted by cam 20 on finger 19 can be broken down into two force components 22 and 23. The force 22 is the force used to displace disc 2 and it should be noted that it lies substantially in line with an extension of the return force exerted by spring 8. Force 23 is supported by lever 17 and produces friction on the axis of the latter. This friction is unimportant, however, since the displacements on the pivot of the lever 17 are of small amplitude and in any case it is not difficult to construct pivots resisting such frictional forces. Likewise, it is very easy to decrease the friction between the extension of finger 19 and disc 2, so that this friction is negligible such that it can be stated that the line of action of force 22 is parallel to that of the return force.

Even if the friction between the finger 19 of lever 17 and disc 2 were not negligible, this would be translated by a slight inclination of arrow 22 upward and the result would be a gentle pressure of the upper part of disc 2 against the mounting 3, this pressure being much less, however, than is the case in the embodiment according to FIGURE 2. To reduce as far as possible the friction between the finger 19 of lever 17 and disc 2, the finger could be replaced by a roller pressing against the rear surface of disc 2.

Naturally, it is not necessary that the portion of the finger 19 of lever 17, which cooperates with cam 20, be an extension of the finger which cooperates with disc 2 and is selecting another arrangement of these fingers, one can use lever 17 as a multiplier of the displacement imposed by cam 20, which permits further reduction of the dimensions of the latter.

I claim:
1. In an objective lens including a mounting, a support for lenses mounted for sliding movement within said mounting, a fixed member in said mounting, a rod slidably supported in said fixed member and disposed along an axis parallel to the movement of said lens support, one end of said rod secured to said support, a spring having one end abutting and supported by the opposite end of said rod, the opposite end of said spring bearing against said fixed member whereby said spring exerts a singular force in the direction of movement of said support to normally urge said support towards said fixed member, means for controlling displacement of said support comprising an elongated lever pivoted on the mounting and contacting the support to displace it longitudinally within the mounting against the action of said spring, the pivot point of said lever disposed at a point spaced from the line of force of said spring, a cam pivotally secured in said mounting and angularly displaceable for engagement with the lever to pivot said lever and displace the support away from said fixed member against the action of the spring, said lever being mounted so that its point of contact on the support is located substantially on the line of action of said spring for all positions which said support must occupy during its longitudinal displacement to thereby reduce the friction between said support and the mounting.

2. The structure according to claim 1, wherein the spring is disposed parallel to the direction of displacement of the support, said spring being a coil spring and disposed entirely on one side of the optical axis of the lenses of the support.

3. The structure according to claim 2, wherein the lower end of the lever has two lateral fingers projecting therefrom, one of said fingers engaging said cam and the other finger engaging said support.

References Cited

FOREIGN PATENTS 235,041   4/1962   Austria.

JEWELL H. PEDERSEN, *Primary Examiner.*

R. J. STERN, *Assistant Examiner.*